United States Patent [19]
Shintani et al.

[11] Patent Number: 5,223,878
[45] Date of Patent: Jun. 29, 1993

[54] REMOTE CONTROLLED CAMERA SYSTEM

[75] Inventors: Dai Shintani; Hiroyuki Okada, both of Sakai; Yoshihiro Tanaka, Osaka; Sadafusa Tsuji, Osakasayama, all of Japan

[73] Assignee: Minolta Camera Kabushiki Kaisha, Osaka, Japan

[21] Appl. No.: 938,545

[22] Filed: Aug. 28, 1992

Related U.S. Application Data

[63] Continuation of Ser. No. 676,189, Mar. 27, 1991, abandoned.

[30] Foreign Application Priority Data

| Mar. 28, 1990 | [JP] | Japan | 2-79090 |
| Mar. 28, 1990 | [JP] | Japan | 2-79091 |
| Mar. 28, 1990 | [JP] | Japan | 2-79092 |

[51] Int. Cl.$^5$ .................. G03B 17/00; G03B 17/18
[52] U.S. Cl. ................. 354/289.1; 354/293
[58] Field of Search ........... 354/202, 293, 294, 295, 354/288, 81, 94, 95, 96, 98, 99; 352/69, 70, 71, 93, 94, 243; 358/97, 108, 125, 126

[56] References Cited

U.S. PATENT DOCUMENTS

| 5,043,750 | 8/1991 | Yamaguchi | 354/81 |
| 5,066,970 | 11/1991 | Kakita et al. | 354/81 X |
| 5,107,288 | 4/1992 | Kakita et al. | 354/99 |

FOREIGN PATENT DOCUMENTS

| 60-138522 | 7/1985 | Japan . |
| 60-139998 | 7/1985 | Japan . |

*Primary Examiner*—W. B. Perkey
*Attorney, Agent, or Firm*—Willian Brinks Olds Hofer Gilson & Lione

[57] ABSTRACT

A camera operated by a remote control device includes a zoom lens. The camera has a plurality of photographing modes. In a first mode, an object is photographed at a predetermined magnification and in a second mode, the object is photographed together with the background thereof. A desired photographing can be taken in response to a signal from the remote control device.

Furthermore, the camera can rotate to upward, downward, rightward and leftward by a signal from the remote control device.

10 Claims, 19 Drawing Sheets

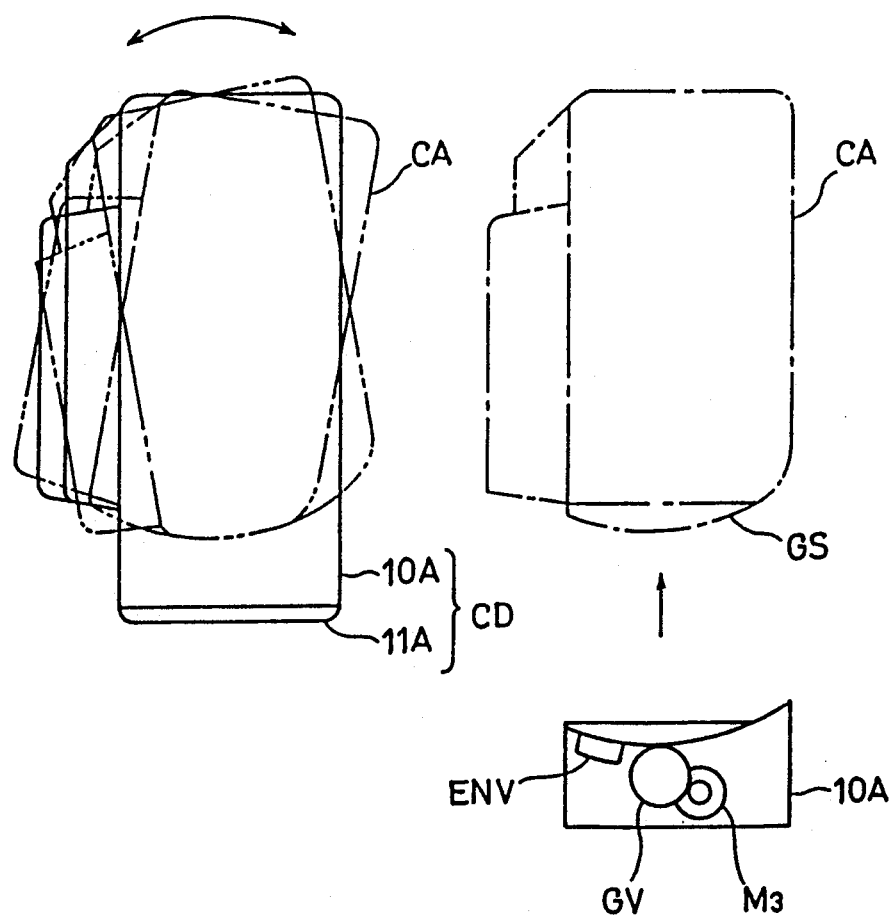

FIG.7(a)
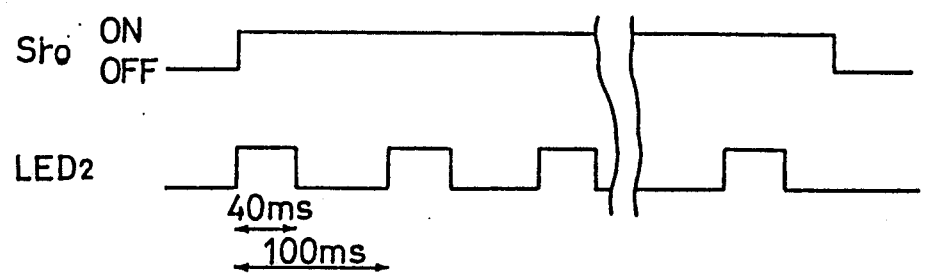
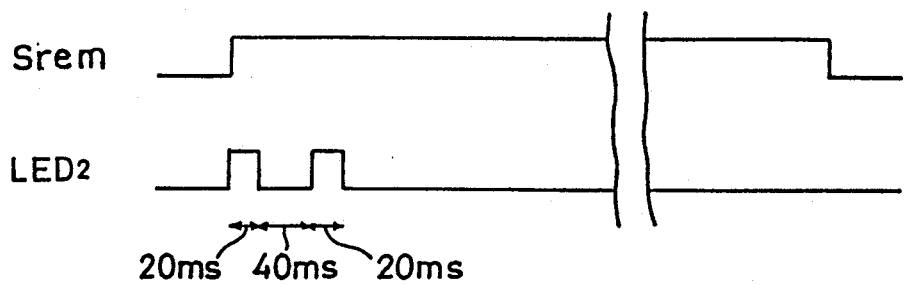
FIG.7(b)

FIG.9

TABLE (1)

| DISTANCE DATA (ZONE NO.) | PARAMETER D |
|---|---|
| 1 | 11715 |
| 2 | 6622 |
| 3 | 4726 |
| 4 | 3683 |
| 5 | 3023 |
| 6 | 2567 |
| 7 | 2233 |
| 8 | 1978 |
| 9 | 1776 |
| 10 | 1614 |
| 11 | 1479 |
| 12 | 1367 |
| 13 | 1271 |
| 14 | 1189 |
| 15 | 1118 |
| 16 | 1055 |
| 17 | 999 |
| 18 | 950 |
| 19 | 906 |
| 20 | 866 |
| 21 | 830 |
| 22 | 797 |
| 23 | 767 |
| 24 | 740 |
| 25 | 715 |

$f = \beta \cdot D$ ($\beta$ = MAGNIFICATION)

TABLE (2)

| RESULT OF CALCULATION f | STOP POSITION |
|---|---|
| ~38 | 19 |
| ~41 | 18 |
| ~43 | 17 |
| ~46 | 16 |
| ~49 | 15 |
| ~52 | 14 |
| ~55 | 13 |
| ~58 | 12 |
| ~61 | 11 |
| ~64 | 10 |
| ~67 | 9 |
| ~70 | 8 |
| ~73 | 7 |
| ~76 | 6 |
| ~79 | 5 |
| ~82 | 4 |
| ~85 | 3 |
| ~88 | 2 |
| 89~ | 1 |

FIG.14

| DISTANCE TO OBJECT (m) | DISTANCE DATA (ZONE NO.) |
|---|---|
| ~ 8.5 | 1 |
| 8.5 ~ 5.6 | 2 |
| 5.6 ~ 4.2 | 3 |
| 4.2 ~ 3.3 | 4 |
| 3.3 ~ 2.8 | 5 |
| 2.8 ~ 2.4 | 6 |
| 2.4 ~ 2.1 | 7 |
| 2.1 ~ 1.9 | 8 |
| 1.9 ~ 1.7 | 9 |
| 1.7 ~ 1.54 | 10 |
| 1.54 ~ 1.42 | 11 |
| 1.42 ~ 1.32 | 12 |
| 1.32 ~ 1.23 | 13 |
| 1.23 ~ 1.15 | 14 |
| 1.15 ~ 1.08 | 15 |
| 1.08 ~ 1.03 | 16 |
| 1.03 ~ 0.972 | 17 |
| 0.972 ~ 0.925 | 18 |
| 0.925 ~ 0.884 | 19 |
| 0.884 ~ 0.846 | 20 |
| 0.846 ~ 0.812 | 21 |
| 0.812 ~ 0.781 | 22 |
| 0.781 ~ 0.753 | 23 |
| 0.753 ~ 0.734 | 24 |
| 0.734 ~ 0.700 | 25 |

REMOTE CONTROLLED CAMERA SYSTEM

This application is a continuation, of application Ser. No. 07/676,189, filed Mar. 27, 1991, now abandoned.

BACKGROUND OF THE INVENTION

1. Field of the Invention

The present invention relates to cameras equipped with remote control devices. More particularly, the present invention relates to a camera capable of adjusting a focal length of a taking lens and allowing an optical axis of the same to be rotated in response to a signal emitted from a remote control device.

Description of the Related Art

A camera operated by a remote control device is disclosed in Japanese Patent Laying-Open No. 60-139998, for example. According to this gazette, the camera operated by a remote control device is provided on a pan head which receives an optical signal from the remote control device to calculate a gap between a direction of an optical axis of the camera and a direction of the remote control device, and which moves the optical axis by motor drive so as to fill the gap. Therefore, the optical axis of the camera automatically faces toward the remote control device. The camera is movable not only in right and left directions but also in upward and downward directions of an optical axis of an optical signal from the remote control device. Furthermore, it is also possible to output a signal indicating to an object that the camera and the remote control device have a predetermined locational relation.

A conventional remote controlled camera structured as described above enables photographing, irrespective of a relation between the optical axis of the camera and the remote control device before the photographing. Remote controlled photographing falls into two cases one in which a picture is taken, at an appropriate magnification, of only an operator of the remote control device or the operator and persons around him, and the other in which a picture is taken of a photographer (operator) with full of his background. However, a conventional camera capable of remote-controlled photographing does not aim for taking a picture in such a case. In particular, it is not possible to take a picture of the operator of the remote control device with full of his background by using the remote control device.

In addition, a conventional camera, whose optical axis rotates to up, down, rightward and leftward by a signal from a remote control device, is not capable of determining whether it receives an instruction signal or not, or the camera reaches its rotational limit when the camera body does not rotate to a desired direction.

Furthermore, moving the optical axis of the camera by the remote control device consumes large power because the camera receives a signal from the remote control device at all times. However, there has been no camera operable by a remote control device and improved for reducing power consumption.

SUMMARY OF THE INVENTION

One object of the present invention is to provide a remote controlled camera system which can be switched to enter a mode in which a picture is taken, by using a remote control device, at an appropriate magnification, of only an operator thereof or the operator and persons around him, and a mode in which a picture of the operator is taken with full of his background.

Another object of the present invention is to provide a remote controlled camera system including a taking lens whose optical axis is rotatable by a remote control device and enabling an operator to know when the camera reaches its rotational limit.

A further object of the present invention is to provide a remote control device consuming less power and a remote controlled camera system equipped with such a remote control device.

The above-described objects of the present invention can be achieved by a remote controlled camera system including a camera body and a remote control device emitting a signal to the camera body, the camera body including: a taking lens whose focal length can be changed, a distance measuring device for measuring a distance to an object, a calculator for calculating a focal length of the taking lens in according with a distance to the object, a mode setter for setting a first mode or a second mode, and a driver responsive to the signal from the remote control device for driving the taking lens, in the first mode, to a position of a focal length calculated by the calculator and to a position of a predetermined focal length in the second mode.

Since the remote controlled camera system includes the above-described elements, the taking lens is moved in response to the signal from the remote control device. Thus, it is possible, for example, to photograph, by using the remote control device, only the operator thereof at an appropriate magnification in the first mode and photograph the operator with full background in the second mode.

According to another aspect of the present invention, a remote controlled camera system including a camera body and a remote control device generating to the camera body a signal for rotating an optical axis of a taking lens provided at the camera body upward and downward or rightward and leftward, includes a rotation driver responsive to the signal from the remote control device for rotating the optical axis of the taking lens and an indicator for indicating that the rotation of the optical axis of the taking lens reaches its rotational limit.

The remote controlled camera system including the above-described elements enables indication of the optical axis of the taking lens reaching its rotational limit. As a result, the operator can be informed thereof.

According to another aspect of the present invention, a remote controlled camera system including a camera body and a remote control device emitting to the camera body a signal for rotating an optical axis of a taking lens provided at the camera body upward and downward or rightward and leftward, the camera body comprising: rotation driver responsive to the signal from the remote control device for rotating the optical axis of the taking lens, and stopper for stopping the rotation of the optical axis of the taking lens by rotation driver when receiving no signal from remote control device for a predetermined time period.

In the remote controlled camera system including the above-described elements, the rotation of the optical axis of taking lens can be stopped when the camera receives no signal from the remote control device for a predetermined time period. As a result, the power consumption can be reduced in the remote controlled camera system.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are views showing a camera driving portion.

FIG. 7 is a diagram explaining the contents of signals output from the remote control device.

FIG. 9 is a diagram explaining a manner of obtaining a focal length of a lens in auto-zoom.

FIG. 14 is a diagram showing a relation between a distance to the object and distance data.

DESCRIPTION OF THE PREFERRED EMBODIMENTS

Embodiments of the present invention will be described in the following with reference to the drawings.

Figure 1:
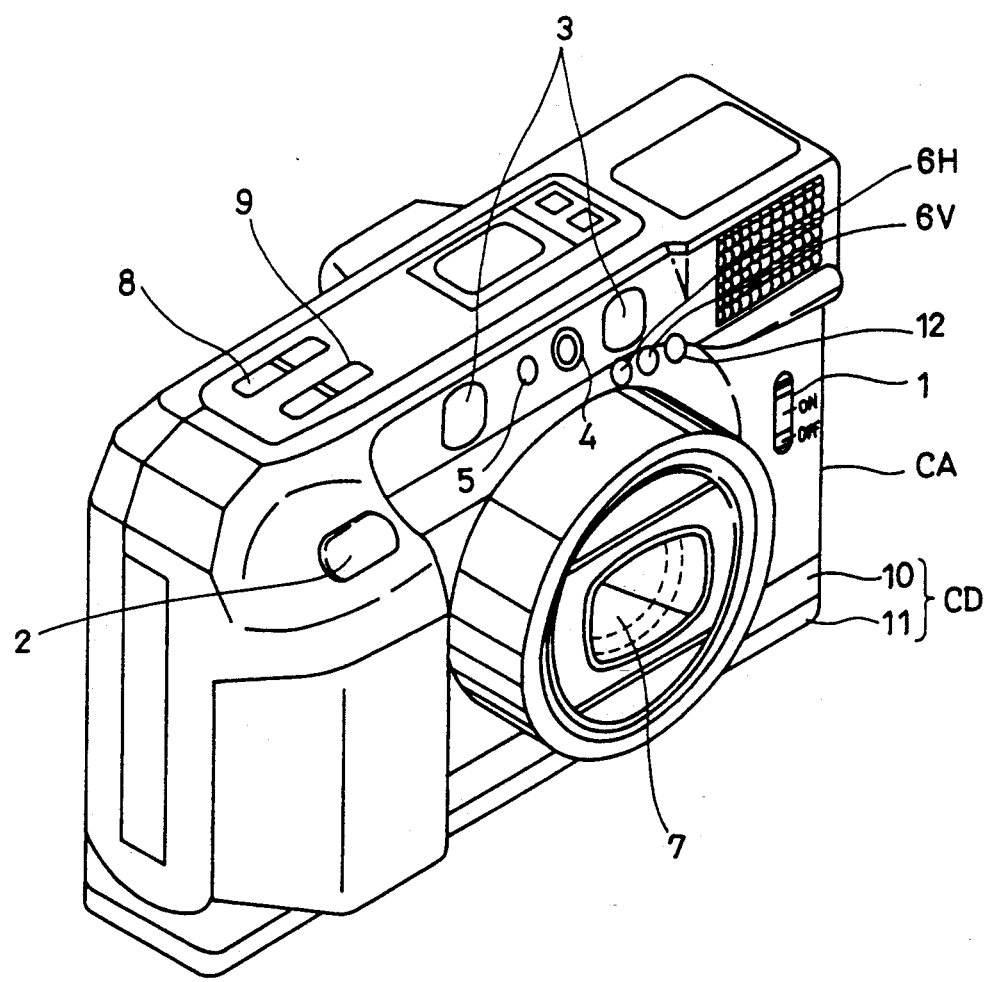
FIG. 1 is a perspective view showing a camera according to the present invention.

With reference to FIG. 1, the camera according to the present invention comprises a camera body CA and a camera driving portion CD. Operation of the camera is allowed and inhibited by turning on and turning off a main switch 1, respectively. Light measurement/distance measurement is carried out at a first stroke of a release button 2 provided at an upper portion of the camera body CA and exposure is performed at a second stroke thereof. An autofocus (referred to as AF hereinafter) window 3 for measuring distance is provided on the front surface of the camera body CA. Further provided on the front surface of the camera body CA are a finder 4, a photometry window 5 and a light receiving window 6 for remote control for receiving infrared light from a remote control device all positioned above a taking lens 7. A zoom lever 8 and a mode switching button 9 are provided at the upper portion of the camera body CA. Moving zoom lever 8 rightward direction in the drawing enables a zoom-in operation and moving the same in the opposite direction enables a zoom-out operation. Every push of mode switching button 9 makes switching between a normal photographing mode wherein photographing is performed without using a remote control device and a remote-controlled photographing mode wherein photographing is performed by using a remote control device.

The camera driving portion CD comprises a vertical direction driving portion 10 for driving an optical axis of taking lens 7 in a vertical direction when operation of the camera is controlled by a remote control device and a horizontal driving portion 11 for driving the optical axis of taking lens 7 in a horizontal direction in the remote-controlled camera operation. Provided on the front surface of the camera body CA are an indicator LED 12 and light receiving windows 6H and 6V for remote control for horizontal and vertical directions. At the time of remote-controlled photographing, indicator LED 12 indicates to an operator of a remote control device whether the operator is included in the angle of view of the camera or not.

Figure 2:
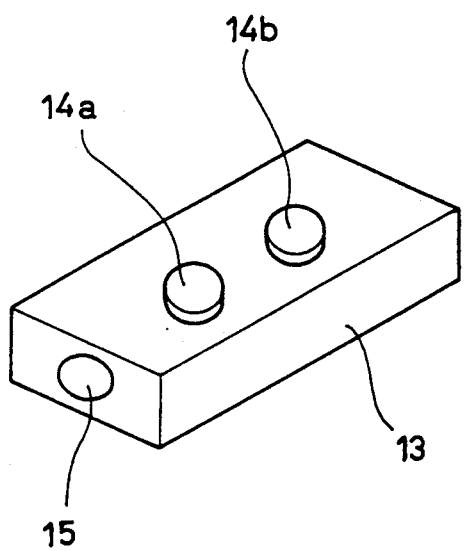
FIG. 2 is a perspective view of a remote control device.

With reference to FIG. 2, a remote control device 13 will be described. Remote control device 13 is provided with a remote control release button 14a, a camera rotation instructing button 14b and a LED 15. Every push of remote control release button 14a and camera rotation instructing button 14b causes infrared LED 15 to emit light to enable a remote-controlled operation of the camera.

Figure 3A:
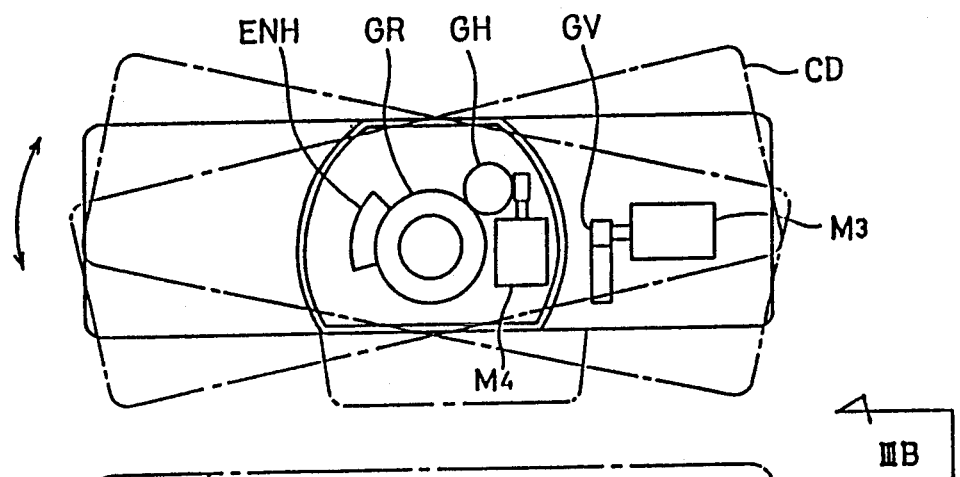
Figure 3A:
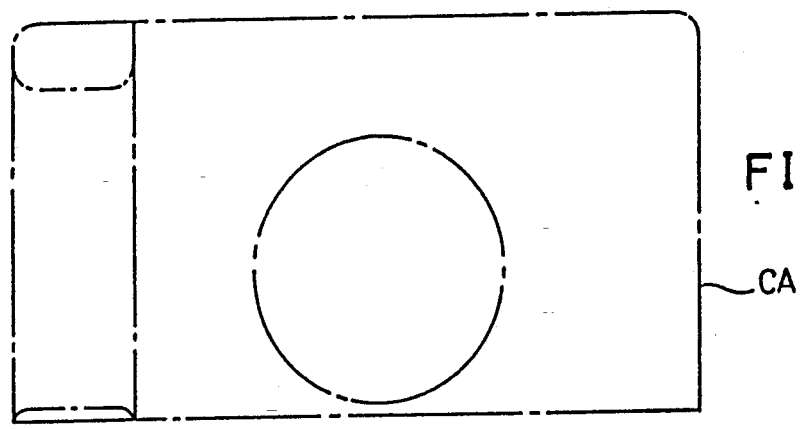
Figure 3A:
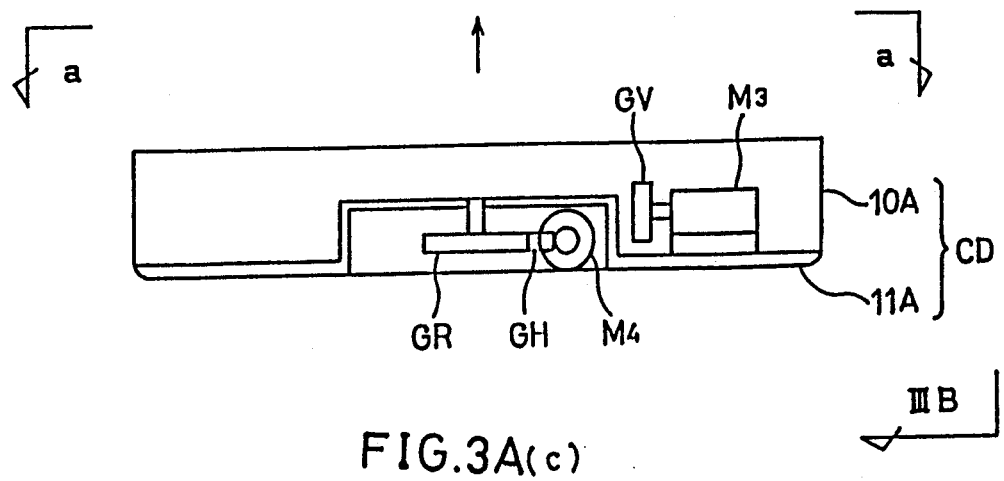

With reference to FIGS. 3A and 3B, operation of the camera body CA at the time of remote-controlled photographing will be described. The camera body CA is supported by a vertical stand 10A including vertical direction driving portion 10 so as to be slidable in a vertical direction. Vertical stand 10A is rotatably supported by a horizontal stand 11A including horizontal direction driving portion 11. Horizontal direction driving portion 11 includes a horizontal driving motor M4, a reduction gear array GH connected thereto and an encoder ENH for outputting such a signal as will be described later with reference to FIG. 6 all provided at horizontal stand 11A. A rotation gear GR to be engaged with reduction gear array GH is fixed to vertical stand 10A thereby allowing the same to rotate in a horizontal direction with respect to horizontal stand 11A when horizontal driving motor M4 rotates.

FIG. 3A(a) is a plan view of the camera driving portion CD and FIG. 3A(c) is an elevational view thereof. Such a camera as shown in FIG. 1 can be obtained by fixing the camera body CA shown in FIG. 3A(b) on the camera driving portion CD. The camera body CA is rotated in a horizontal direction as indicated by the arrow of FIG. 3A(a) by horizontal driving portion 11.

FIG. 3B is a view of a combination of the camera body CA and the camera driving portion CD seen from the direction indicated by IIIB—IIIB of FIG. 3A. As indicated by the arrow of FIG. 3B(a), the camera body CA swings on the camera driving portion CD in a vertical direction.

Figure 4A:
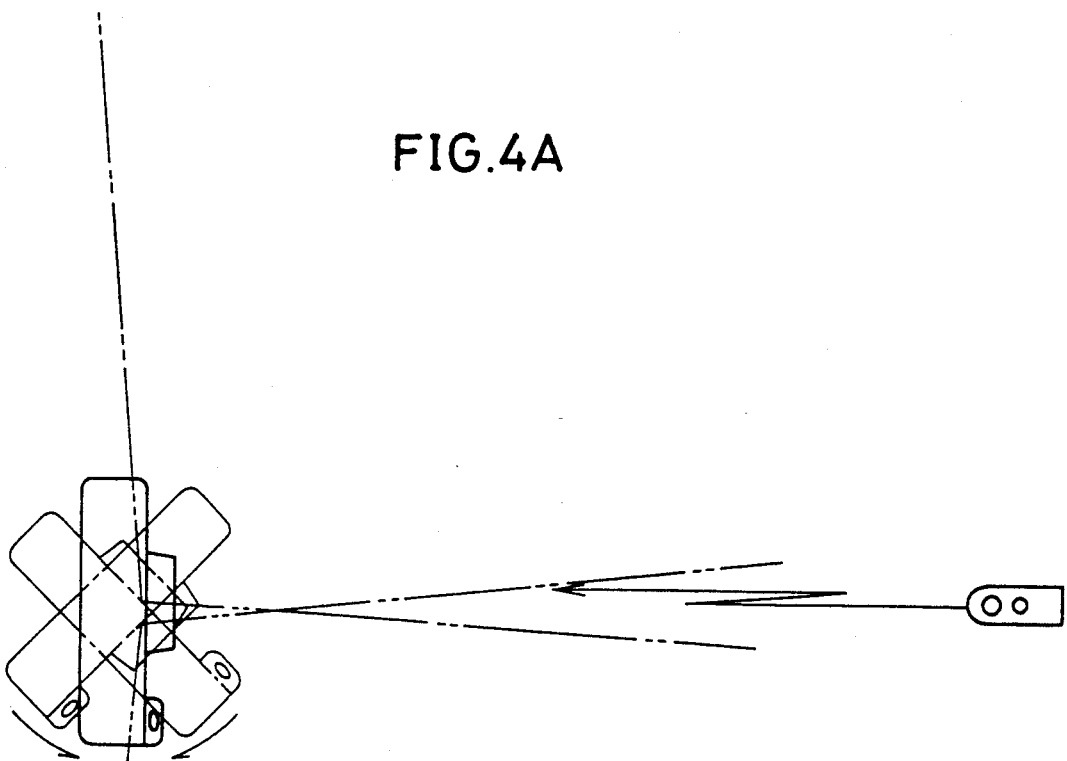
FIGS. 4A and 4B are views explaining a locational relation between a camera body and the remote control device.
Figure 4B:
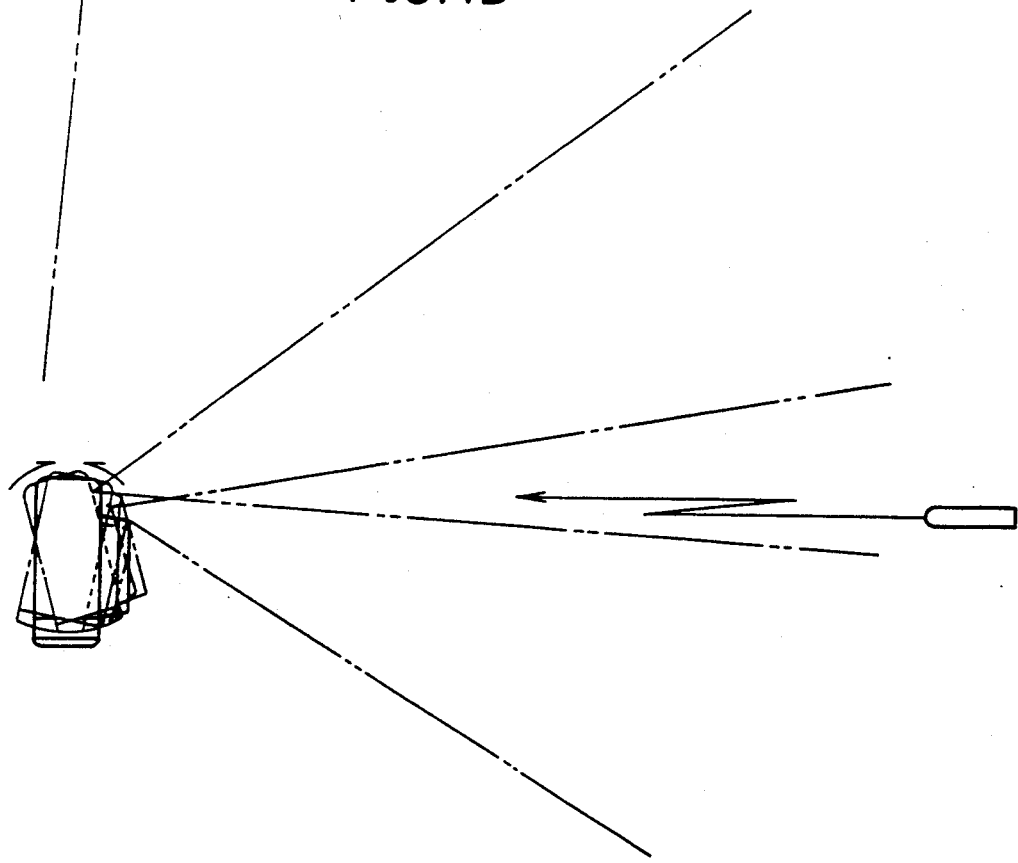
Figure 6:
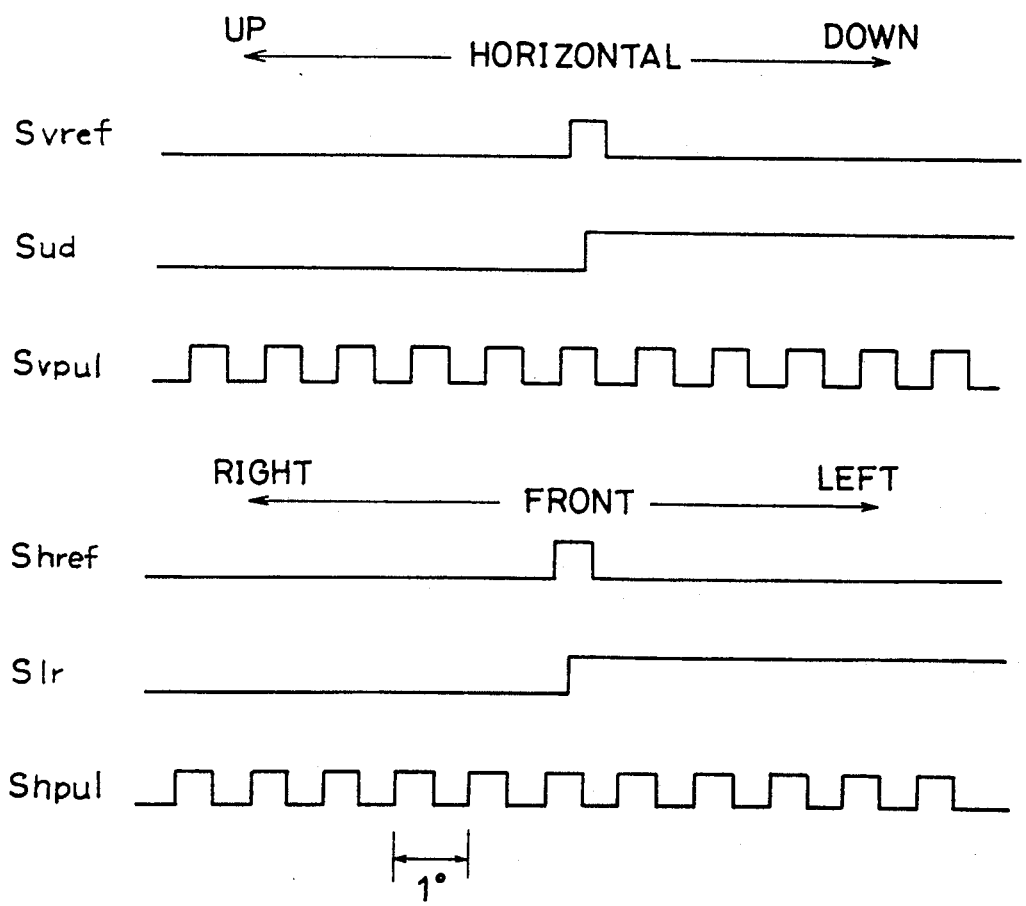
FIG. 6 is a diagram explaining the contents of signals output from various switches of the camera according to the present invention.

With reference to FIG. 3B, vertical direction driving portion 10 includes motor M3 for vertical drive, reduction gear array GV connected thereto and encoder ENV for outputting such a signal as will be described later with reference to FIG. 6, all of which are fixed to vertical stand 10A. Reduction gear array Gv is connected to a swing gear GS fixed to the camera body CA. The rotation of motor M3 for vertical drive causes the camera body CA to swing with respect to vertical stand portion 10A. As a result, the optical axis of taking lens 7 swings up and down. A locational relation between the camera body CA and remote control device 13 are shown in FIGS. 4A and 4B.

Figure 5:
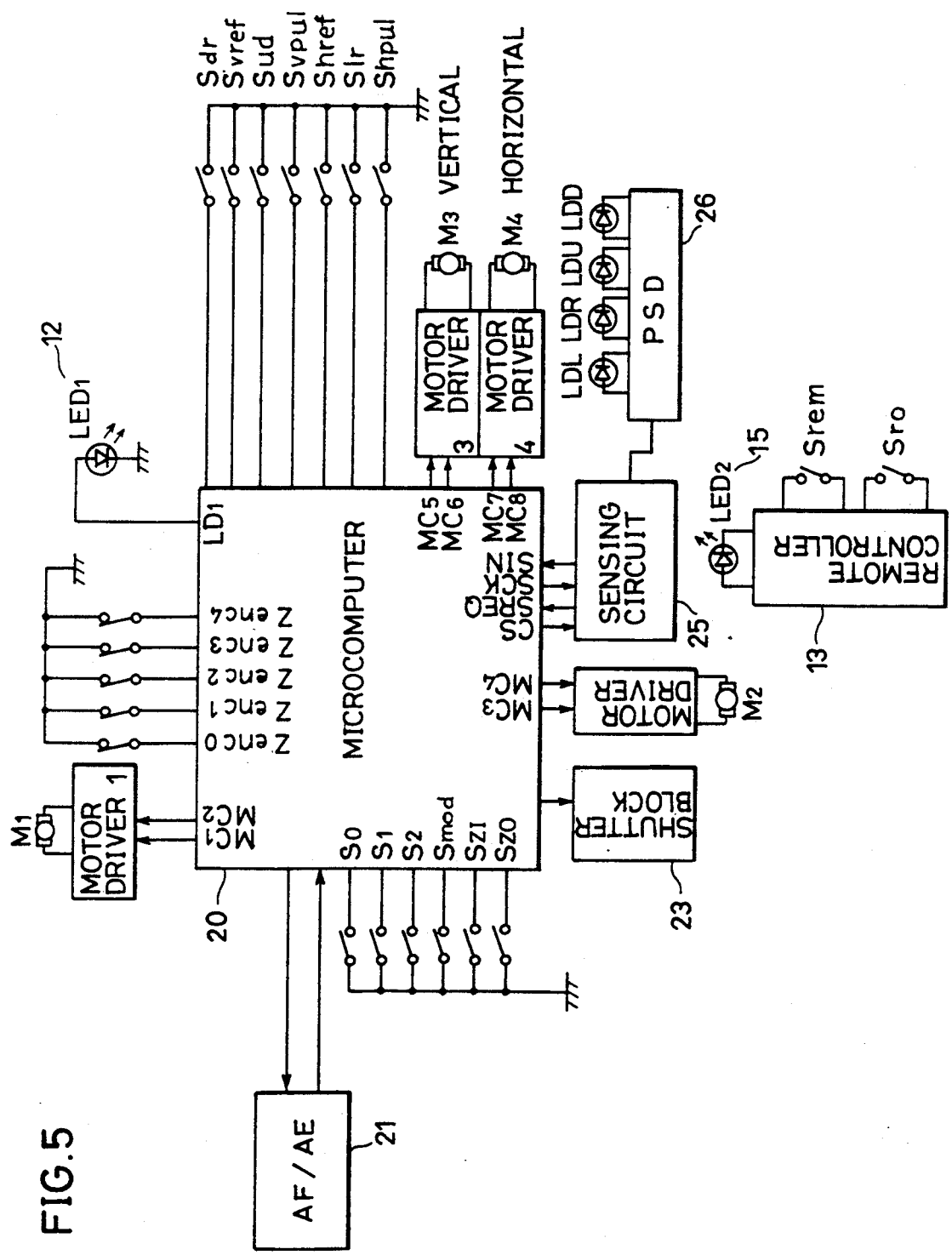
FIG. 5 is a block diagram of a circuit of the camera according to the present invention.

With reference to FIG. 5, a circuit block diagram of a camera to which the present invention is applied will be described. A microcomputer 20 controls operations such as light measurement, distance measurement and film winding depending on a state of each switch. Each switch will be described first. Turning-on and turning-off of a main switch S0 allows and inhibits operation of the camera, respectively. A light/distance measuring switch S1 is turned on at a first stroke of release button 2 shown in FIG. 1. A release switch S2 is turned on at a second stroke of release button 2. A mode switch Smod is turned on by pressing mode switching button 9 of FIG. 1. A zoom-in switch Szi is turned on by moving zoom lever 8 shown in FIG. 1 toward the rightward direction. A zoom-out switch Szo is turned on by moving zoom lever 8 toward the leftward direction. A vertical reference switch Svref turns on when the optical axis is parallel to a horizontal plane on which the optical axis is rotated by the horizontal driving portion 11. An up-and-down determining switch Sud turns on when the camera faces downward and turns off when the same faces upwards. A switch Svpul is alternately turned on and off every time the optical axis ia rotated 1 degree in the horizontal direction. A horizontal reference switch Shref is turned on when the camera takes a predetermined position (initial position) on the horizontal plane. A right/left determining switch Slr is turned on when the camera faces right and turns off when the same faces left. A switch Shpul is alternately turned on and off every time the optical axis is rotated 1 degree in the vertical direction. Signals from the respective switches Svref, Sud, Svpul, Shref, Slr and Shpul have such relations as shown in FIG. 6.

Microcomputer 20 is connected to a light measurement/distance measurement block AF/AE21 for enabling light measurement and distance measurement in response to a signal from microcomputer 20 and transmitting the result thereof to microcomputer 20. A shutter block 23 drives the lens for AF and drives shutter for exposure in response to the signal from microcomputer 20. A motor driver 1 drives a zoom motor M1. Rotation (regular or reverse), braking and on/off of the driver are controlled depending on the levels ("H" (logical high) or "L" (logical low)) of the potentials of terminals MC1 and MC2. A motor driver 2 drives a winding-/rewinding motor M2 and is controlled similarly to motor driver 1 in response to potentials of terminals MC3 and MC4. A motor driver 3 drives a motor M3 for vertical drive of the camera and is controlled similarly to driver 1 in response to potentials of terminals MC5 and MC6. A motor driver 4 drives a motor M4 for horizontal drive of the camera and is controlled similarly to motor driver 1 in response to potentials of terminals MC7 and MC8. Indicator LED 12 shown in FIG. 1 is represented as a LED 1 and controlled to be turned on or off in response to a potential at a terminal LD1. A sensing circuit 25, when a PSD (position sensor diode=position detecting element) 26 receives a signal from remote control device 13, detects a gap between a direction of the optical axis of taking lens 7 and the position of remote control device 13 at that time point in response to the signal from PSD 26 to transmit direction data to microcomputer 20. Remote control device 13 is provided with a LED 2 corresponding to an infrared LED 15 for transmitting a remote control signal as an infrared light to the camera. As described in FIG. 2, upon turning-on of a remote control switch Srem or Sro by pressing button 14a or 14b, LED 2 emits light to transmit a signal to the camera.

Operation of a zoom encoder Zenc will be described later.

With reference to FIG. 7, operation of a remote control circuit RM provided in remote control device 13 will be described. As shown in FIG. 7(a), remote control circuit RM outputs modulated (for example, 1 MHz) driving current when switch Sro is turned on such that infrared light emitting diode LED 2 intermittently emits light until switch Sro is turned off. As shown in FIG. 7(b), when switch Srem is turned on, remote control circuit RM outputs modulated driving current such that infrared light emitting diode LED 2 emits pulse light.

Figure 8:
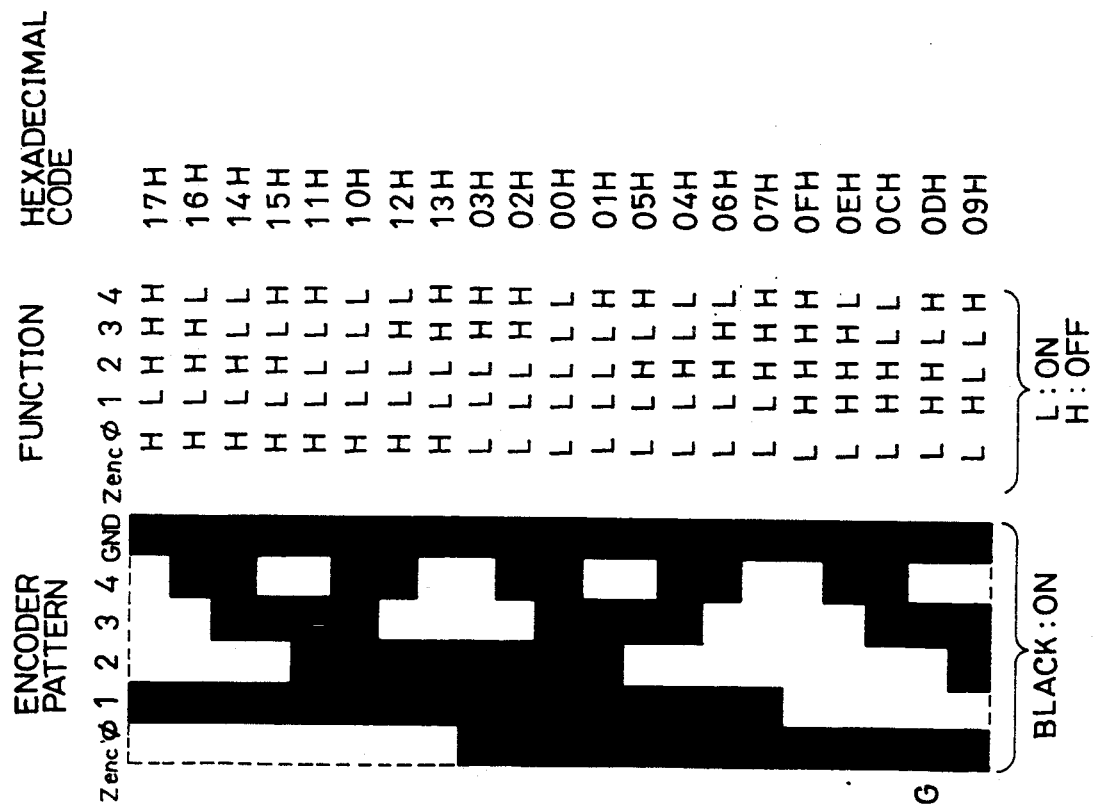
FIG. 8 is a diagram explaining output signals of an encoder.

FIG. 8 is a diagram showing relations between output signals of zoom encoders Zenc 0-4 and the focal lengths of taking lens 7. With reference to FIG. 8, zoom encoders Zenc 0-4 are of a gray code type and has an encoder pattern as shown at the center of the figure. Each zoom encoder has 21 zoom positions represented as 1 to 21 and a representative focal length for each zoom position is represented as a representative f value. For example, the representative f value obtained at the zoom position 1 is 90 mm and taking lens 7 in this case is at a tele end. The representative f value obtained at the zoom position 19 is 38 mm and taking lens 7 in this case is at a wide end. Zoom positions 20 and 21 are those in which taking lens 7 is in a retracted state. The encoder pattern is as shown at the center of the figure and output signals as shown (Zenc0-Zenc4) are supplied as encoder signals from an encoder brush. The contents of the signals are shown in the column of "function" in which on and off states of the encoder pattern are represented as "H" and L", respectively. The contents of the functions are represented as hexadecimal codes. More specifically, when a zoom position is defined, the representative f value is defined accordingly and the output data in that case is output as a hexadecimal code in five bits.

Now, auto-zoom for use in a camera to which the present invention is applied will be described. Auto-zoom is a function of automatically adjusting a focal length f of a taking lens to $\beta \times D$ in order to obtain a set photographing magnification $\beta$ with respect to a distance D to a given object. In general, when taking a picture from lateral direction, for example, the magnification $\beta$ for a full length picture, that for a from-the-waist-up picture and that for a face picture are set to 1/70, 1/35 and 1/15, respectively.

Description will be made on how to obtain a focal length of taking lens 7 in auto-zoom. With reference to FIG. 9, Table (1) is used to refer to a parameter D based on a zone number relating to the data representing distance data determined based on a distance to an object. The parameter D represents a real distance in mm. A focal length f is obtained by calculating a product of the parameter D and photographing magnification data $\beta$ predetermined in a photographing mode. Table (2) represents stop positions of the taking lens in the auto-zoom mode based on the focal length f obtained by the calculation. A focal length of the lens in the auto-zoom can be obtained by the data thus obtained by the foregoing distance measurement. Both Tables (1) and (2) are prepared and stored in the RAM (not shown) of microcomputer 20.

Figure 10:
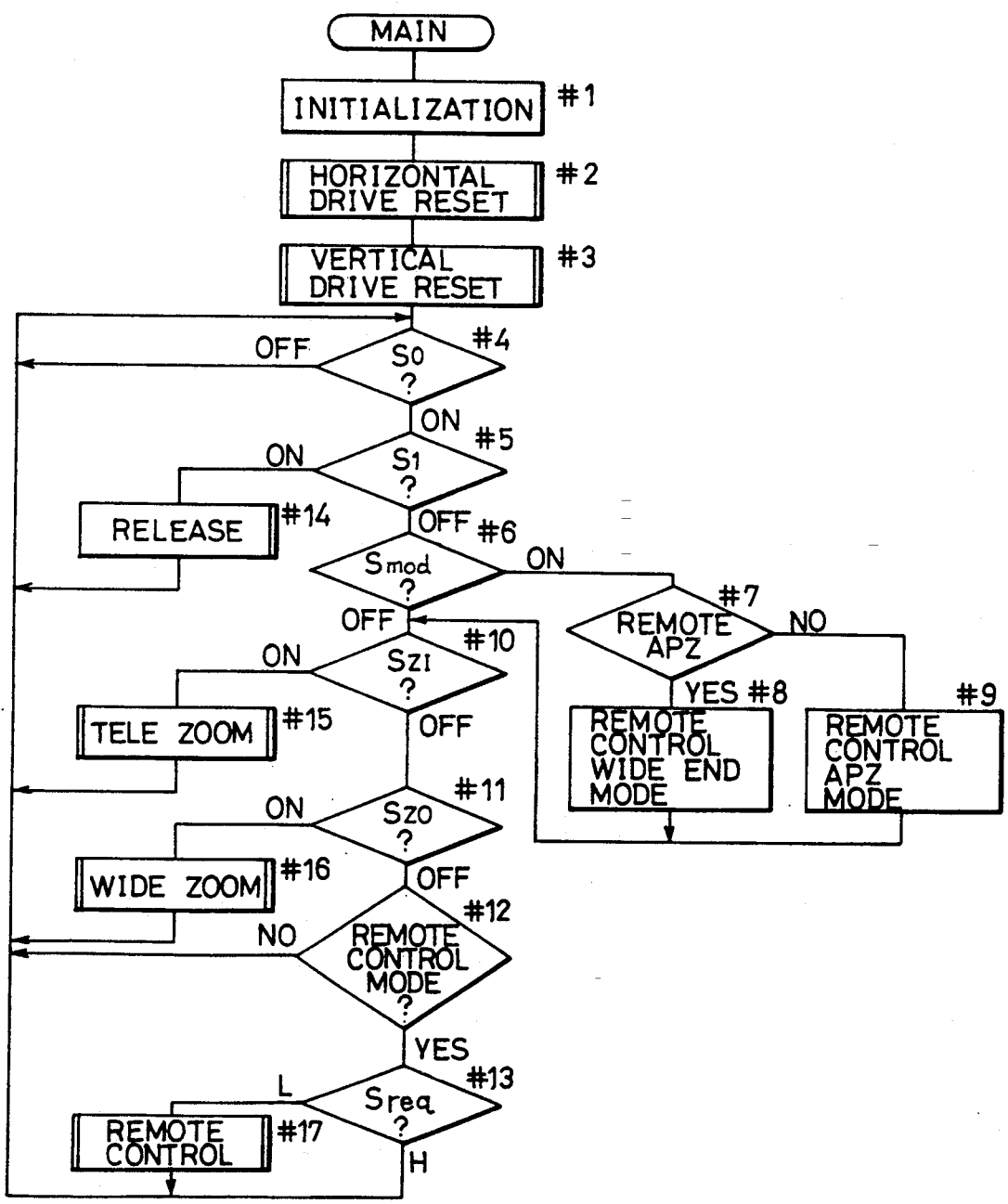
FIG. 10 is a flow chart of a main routine showing the operation of the camera according to the present invention.

Operation of a camera to which the present invention is applied will be described with reference to FIG. 10. FIG. 10 is a flow chart of a main routine. Upon turning-on of the battery of the camera, the camera is initialized in step #1 ("step" will be omitted hereinafter) and then, a driving portion is reset in #2 and #3 so as to set the driving portion an initial position. Then, in #4, determination is made as to whether main switch S0 is turned on or not. If the determination is made that it is turned on, the program proceeds to #5. When main switch S0 is turned off, program repeats step #4 to wait for main switch S0 to be turned on. The determination is made in #5 as to whether light/distance measuring switch S1 is turned on or not. If the switch is turned on, the program proceeds to a release position routine. The contents of the release position routine will be described later.

When the determination is made in #5 that the light/distance measuring switch S1 is turned off, the program proceeds to #6 wherein the determination is made as to whether mode switch Smod is turned on or not. When mode switch Smod is turned off, the program proceeds to #10. When mode switch Smod is turned on, the program proceeds to #7 wherein the determination is made as to whether the camera is in a portrait mode (remote control APZ) or a landscape mode (remote control wide end). The remote control APZ is a mode in which previously described auto-zooming is carried out by remote control by using remote control device 13 and the remote control wide end mode is a mode in which a large area of a background including an operator of the remote control device is taken picture of. Switching of these mode can be performed also by using remote control device 13. If the remote control APZ mode is set in #7, the mode is changed to the remote control wide end mode (#8) and if the remote control wide end mode is set in #7, the mode is changed to the remote control APZ mode (#9) In other words, every time mode switch Smod is turned on, switching is made between the remote control APZ mode and the remote control wide end mode. Then, the program proceeds to #10. Determination of zoom-in switch Szi is made in #10 and if the switch is on, the program proceeds to a tele zoom routine and if it is off, the program proceeds to #11. Determination is made in #11 as to whether zoom-out switch Szo is on or not, and if it is on, the program proceeds to a wide zoom routine. When it is off, the program proceeds to #12 wherein the determination is made as to whether the present mode is the remote control photographing mode or not. If it is not the remote control photographing mode, that is, it is a normal photographing mode, the program returns to #4 to repeat the above-described operations. When it is the remote control photographing mode, the program proceeds to #13 wherein state of a terminal Sreq is read, and when the signal is at a "H", the program returns to #4. If terminal Sreq is at a "L", that is, if the remote control photographing is performed, the program proceeds to a remote control routine.

Figure 11A:
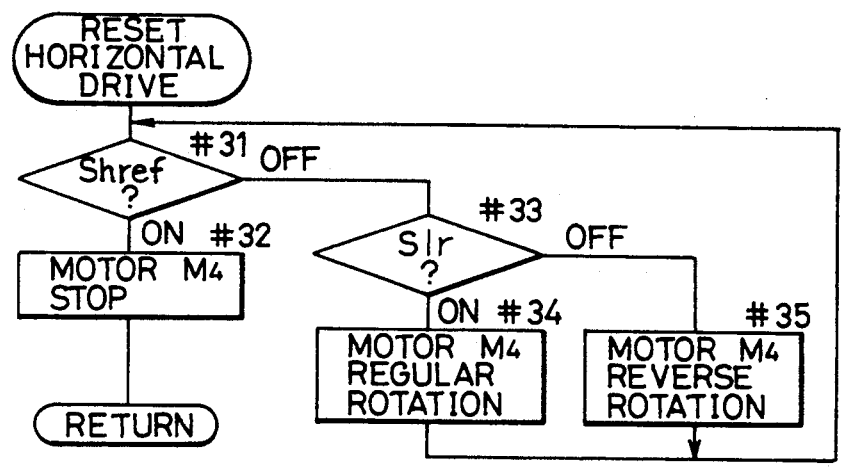
FIGS. 11A, 11B, 12A, 12B and 13 are flow charts explaining the operations according to the present invention.
Figure 11B:
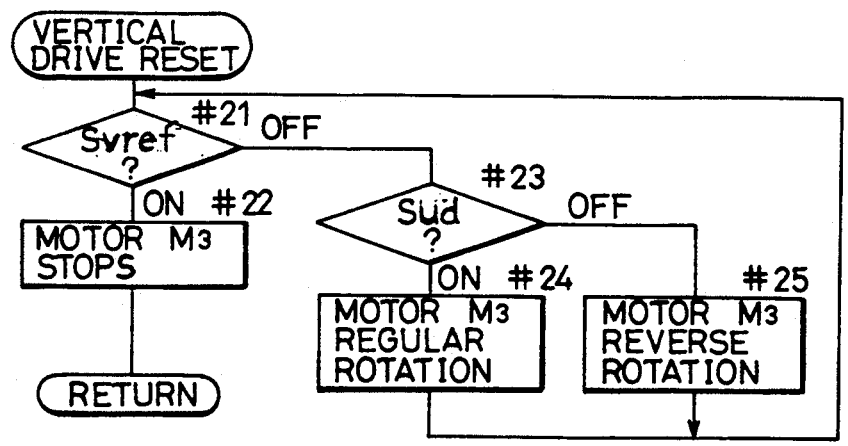

With reference to FIGS. 11A and 11B, horizontal drive reset and vertical drive reset routines will be described. When the driving portion is reset in #2 and #3 of FIG. 10, the program proceeds to these routines. In FIG. 11B, first the determination is made as to an on/off state of Svref in #21, thereby making a determination as to whether the optical axis is parallel to the horizontal plane or not. When the optical axis is parallel to the horizontal plane, the program proceeds to #23 wherein the determination is made based on on/off state of an up-and-down determination switch Sud as to whether the camera at present faces upward or downward. As a result, a rotation direction of vertical drive motor M3 is determined, in accordance with which direction vertical drive motor M3 is rotated regularly or reversely (#24, #25). Then, this operations will be repeated. Thereafter, when optical axis is parallel to the horizontal plane to turn on vertical reference switch Svref, the program proceeds from #21 to #22 to stop vertical drive motor M3 and returns the main routine.

The horizontal drive reset routine shown in FIG. 11A is similar to the vertical drive reset routine described with reference to FIG. 11B.

Figure 12A:
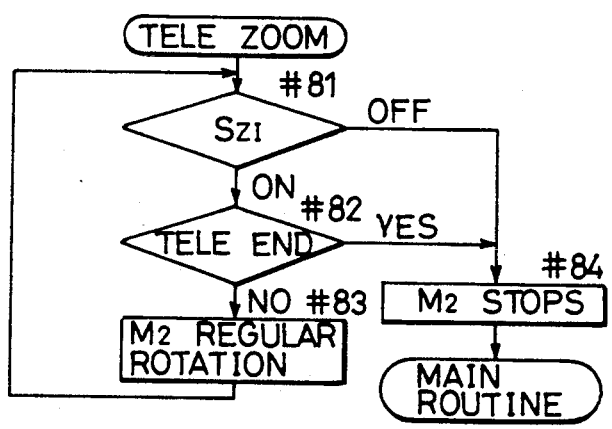
Figure 12B:
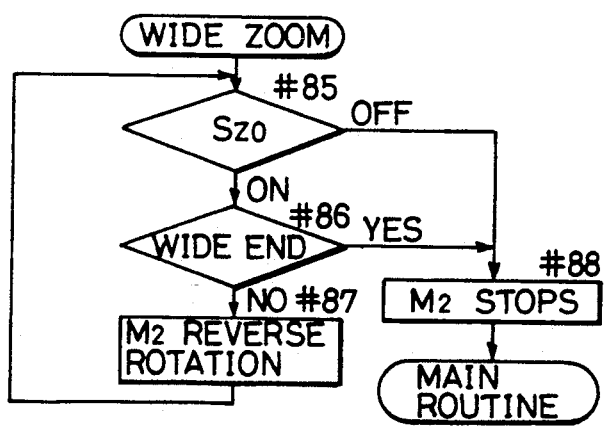

Tele zoom and wide zoom routines will be described with reference to FIGS. 12A and 12B. When the program enters the tele zoom and wide zoom routines shown in #15 and #16 of FIG. 10, this flow is executed. In other words, upon turning-on of zoom-in switch Szi or zoom-out switch Szo by the operation of zoom lever 8 shown in FIG. 1, the flow is executed. With reference to FIG. 12A, the flow chart when zoom-in switch Szi turned on will be described. First, the determination is made in #81 as to whether zoom-in switch Szi is still on or not, and if it is still on, the program proceeds to #82 wherein determination is made as to whether taking lens 7 reaches the tele end or not. If it does not reach it, the program proceeds to #83 to rotate zoom motor M2 regularly to drive taking lens 7 in the tele direction. Then, program returns to #81 to repeat the above-described flow. The program proceeds to #84 when the determination is made in #81 that zoom-in switch Szi is turned off or in #82 that the lens reaches the tele end. In #84, the driving of zoom motor M2 is stopped and the program returns to the main routine. Operation when zoom-out switch Szo shown in FIG. 12B is turned on is similar to that in zoom-in.

A flow chart of light/distance measurement and releasing will be described with reference to FIG. 13. When the determination is made in #5 of FIG. 10 that light/distance measuring switch S1 is turned on, light/distance measurement is first performed in the above-described light/distance measuring block AF/AE in #51. Then, the determination is made in #52 as to whether release switch S2 is turned on or off. If it is turned off, the program proceeds to #53 wherein on/off of light/distance measuring switch S1 is determined. If right/distance measuring switch S1 is on, the program proceeds to #54 and if it is off, the program returns to the main routine. The determination is made in #54 as to whether main switch S0 is turned on or off, and if it is on, the program returns to #52 to repeat the above-described operation. If it is off, the program returns to the main routine. When the determination is made in #52 that the release switch S2 is on, the program proceeds to #55 to perform a sequence of releasing such as lens drive for AF (#55), exposure (#56), lens reset (#57) and film wind-up (#58). The vertical drive reset routine shown in FIG. 11B is made in #59, thereby returning the program to the main routine. When the shutter is released in response to a remote control signal, the same light/distance measuring operation as in #51 is performed in #60 before #55. In the above-described light/distance measurement, distance data is represented as a zone number. FIG. 14 shows a relation between a distance to the object and a zone number.

Figure 15A:
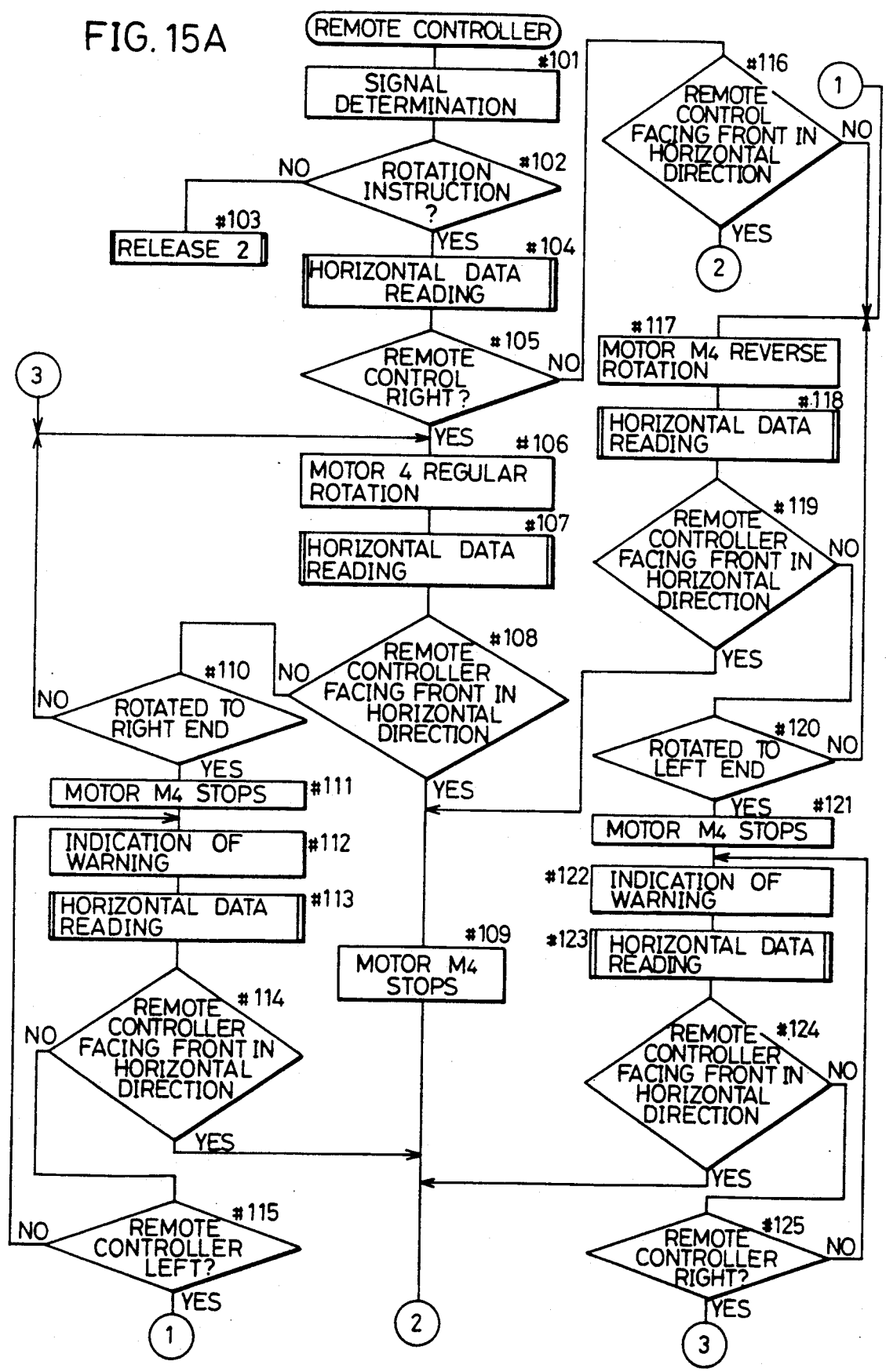
Figure 15B:
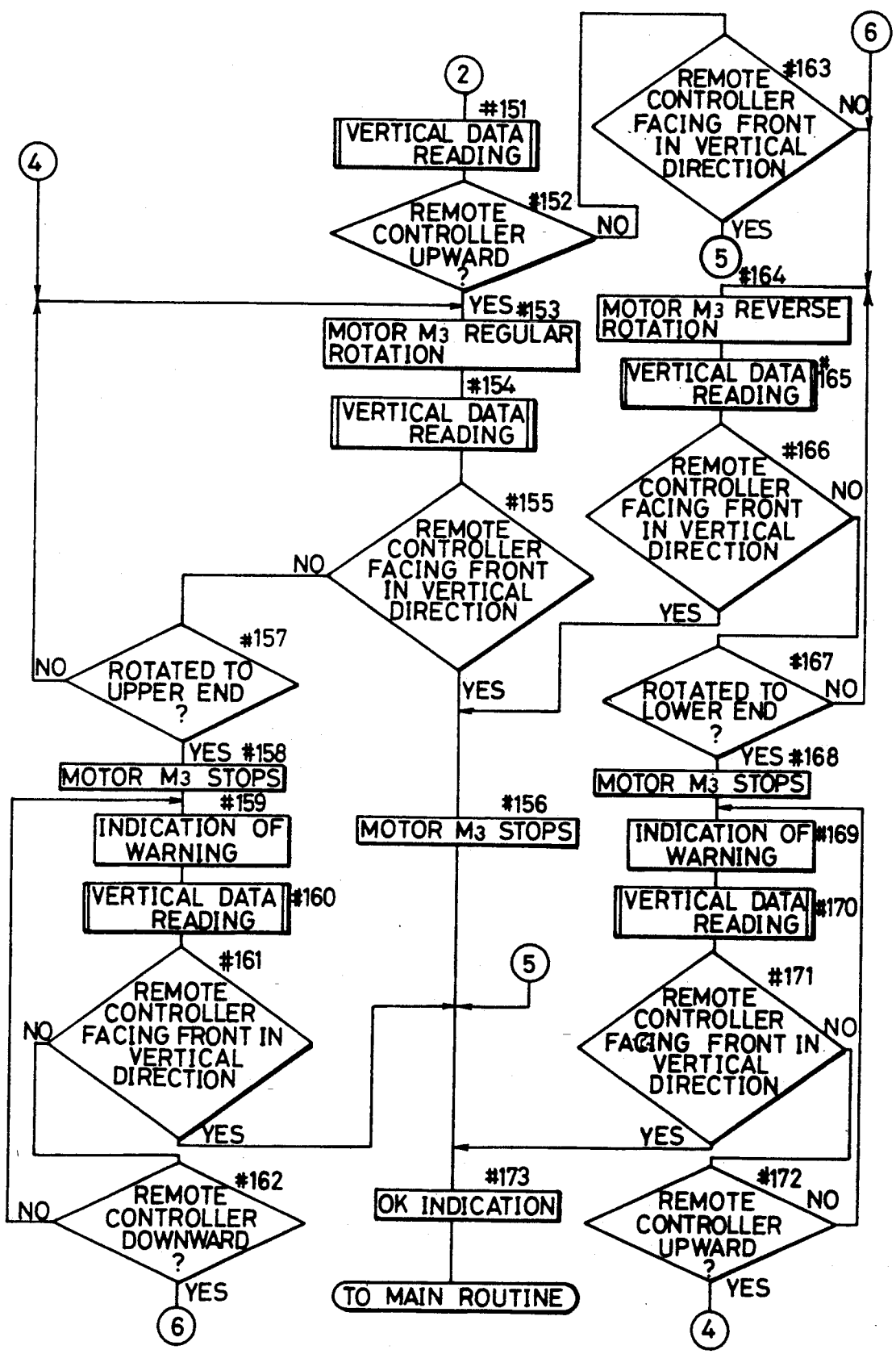

FIGS. 15A and 15B are flow charts showing an operation when the camera receives a remote control signal and terminal Sreq receives a "L" signal. With reference to FIGS. 15A and 15B, the determination is made in

Figure 16A:
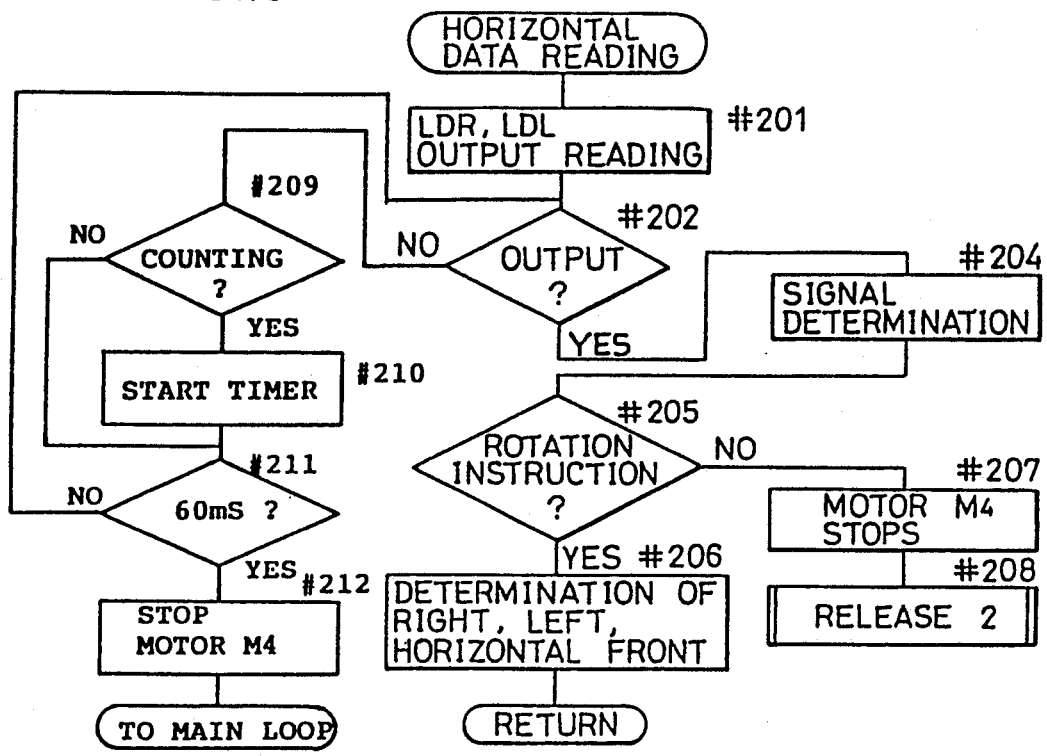

101 whether the received remote control signal is a release signal or a rotation instructing signal. If the determination is made in #102 that the signal is not a rotation instructing signal, which means that the signal is a release signal, the program proceeds to #103 wherein a series of photographing operations shown in the release routine shown in FIG. 13 will be performed. If the signal is a rotation instructing signal in #102, the program proceeds to #104 wherein horizontal data regarding right/left directions of the remote control device 13 with respect to the camera is read as shown in FIG. 16A. If the determination is made in #105 that remote control device 13 is located rightward, motor M4 is regularly rotated to swing the camera body CA rightward in #106. When the camera body CA faces front in a horizontal direction with respect to remote control device 13 after again reading horizontal data in #107, the program proceeds from #108 to #109, thereby stopping the driving of horizontal drive motor M4, after that the program proceeds to #151. If remote control device 13 does not face front with respect to the camera body CA in the horizontal direction yet in #108, the determination is made in #110 as to whether the camera body can not be rotated rightward any more, as the camera body CA has been rotated to the right end. If the camera body does not reach the right end, the program returns to #106 to drive horizontal drive motor M4 until the camera body CA faces front with respect to the remote control device 13 in the horizontal direction, so that the camera continues rotating.

When the determination is made in #110 that the camera body CA is rotated to the right end, horizontal drive motor M4 is stopped in #111, thereby causing indicator LED 12 to emit light to indicate that the camera body CA does not face front with respect to the remote control device 13 in the horizontal direction yet. Thereafter, the horizontal data is again read in #113 and if the determination is made that the camera body CA faces front with respect to the remote control device 13, the program proceeds to #151. The program proceeds in this way for the following reasons. Even after the camera body CA is stopped rotating in response to the stop of horizontal drive motor M4, there is a case where an object (photographer) having remote control device 13 moves. As a result, it is possible that the camera body CA faces front in a horizontal direction with respect to the remote control device 13. On this occasion, it is necessary to enable an operation of a subsequent step because of #113. If remote control device 13 is located leftward in #115, the program proceeds to #117.

If remote control device 13 is not located rightward in #105, the determination is made in #116 as to whether the remote control device faces front B with respect to the camera body CA in a horizontal direction or not. If the determination is made that the remote control device 13 faces front, the program proceeds to #151. When the determination is made in #116 that remote control device 13 does not face front, which means that the same is located leftward with respect to the camera body CA, the program proceeds to #117 through #125 to reversely rotate horizontal drive motor M4 until the camera body CA faces front with respect to the remote control device 13 in a horizontal direction or the same is rotated to the left end in the same manner as in #106-#115 described previously. When the camera body CA is rotated to the left end to stop, the indicator keeps indicating warning until remote control device 13 is located at the front or rightward with respect to the camera body CA. When remote control device 13 is positioned at the front with respect to the camera body CA in the horizontal direction, the program proceeds to #151 and if positioned rightward, program proceeds to #106.

Next, operations in #151–#172 shown in FIG. 15B, which are similar to the operations in #104–#125 in FIG. 15A, will be described. First, vertical data is read in #151. If remote control device 13 is positioned above the camera body CA in #152, vertical drive motor M3 is regularly rotated in #153 to swing the camera body CA upward. When the camera body faces front in a vertical direction with respect to remote control device 13 after again reading the vertical data in #154, the program proceeds from #155 to #156, thereby stopping the driving of vertical drive motor M3. When remote control device 13 does not yet face front with respect to the camera body CA in the vertical direction in #155, the camera body CA is rotated to the upper end in #157 and then the determination is made as to whether the came body can not be rotated further upward or not. If the camera body CA has not be rotated to the upper end, the program returns to #153 to drive vertical drive motor M3, so that the camera body CA keeps rotating until the same faces front in the vertical direction.

When the determination is made in #157 that the camera body CA has been rotated to the upper end, vertical drive motor M3 is stopped in #158. At this time, the camera body CA does not face front with respect to the remote control device 13 in the vertical direction yet, so that indicator LED 12 emits light to warn the operator of the remote control device. Thereafter in #160, the vertical data is again read and when the determination is made that the camera body CA faces front in the vertical direction, the program proceeds to #173. The program proceeds as described above for the following reasons. Even if the camera body stops rotating in response to the stop of the driving of vertical drive motor M3, it is possible that the camera body CA faces front in the vertical direction with respect to remote control device 13 because of the movement of the object having remote control device 13. At this time, there is a case where operation of the subsequent step is required. If remote control device 13 is positioned below the camera body CA in #162, the program proceeds to the step after #164 which will be described in the following.

When remote control device 13 is not positioned above the camera body CA in #152, the determination is made in #163 as to whether the remote control device faces front in a vertical direction with respect to the camera body CA or not. If the remote control device is positioned in front of the camera body CA, the program proceeds to #173. If not positioned in front, which means that remote control device 13 is positioned below the camera body CA, the program proceeds to #164 through #172 as in the case of #153–#162, or vertical drive motor M4 is reversely rotated until the camera body CA is rotated to the lower end. When the camera body CA is rotated to the lower end to be stopped, the indicator LED keeps indicating warning until remote control device 113 is positioned in front or above. At this time, when the remote control device is positioned in front of the camera body CA, the program proceeds to #173 and if positioned below, the program proceeds to #164.

After stopping the vertical drive motor M3, or after making sure that remote control device 13 faces front with respect to the camera body CA in #161 and #171, indicator LED 12 emits light continuously. In other words, it is indicated that the camera body CA finishes facing front with respect to remote control device 13.

Figure 16B:
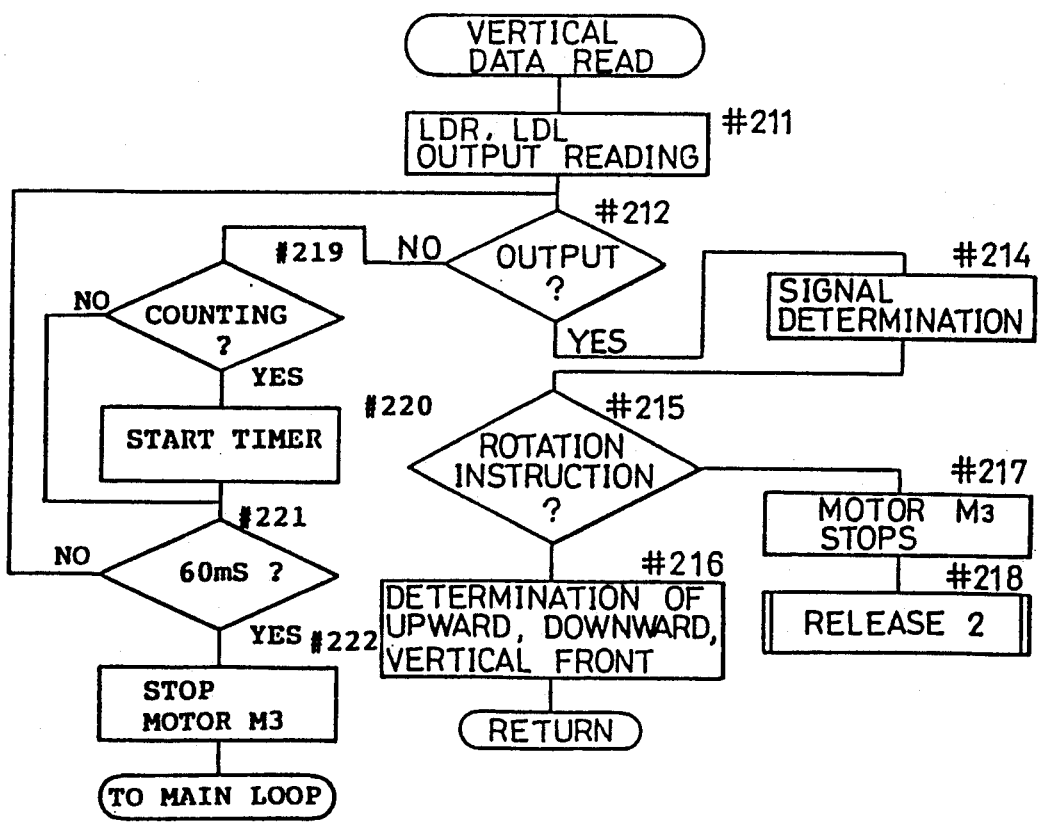

FIGS. 16A and 16B are flow charts showing horizontal data reading operations in #104, #107, #113, #118 and #123 shown in FIGS. 15A and vertical data reading operations in #151, #154, #160, #165 and #170 shown in FIG. 15B, respectively.

With reference to FIG. 16A, output signals are read in #201 from light receiving elements LDR and LDL shown in FIG. 5 and FIG. 17 which will be described later, respectively. The determination is made in #202 as to whether the above-described outputs exist or not. No output means that the operator stops pressing rotation instructing button 14b of remote control device 13 or it means no signal period between intermittent signal, so that the timer is started in #210 to make a determination thereof. Thereafter, the program waits for the timer to count up to 60 msec. If no signal is input during 60 msec, the determination is made that the operator stops operating the remote control device 13. As a result, after the stop of the driving of vertical drive motor M4 in #212, the program returns to the main routine. The program proceeds to #204 when a signal is input from remote control device 13 during the counting of the timer, that is, LED2 of remote control device 13 intermittently emits light as shown in FIG. 7. The determination is made in #204 as to whether the output signals are rotation instructing signals or release signals. When the determination is made in #205 that the signals are rotation instructing signals, comparison is made between the outputs of the light receiving elements LDR and LDL in #206, thereby determining whether the remote control is positioned rightward, leftward or at the front in a horizontal direction of the camera body CA to return the program to the original routine. When the determination is made in #205 that they are not rotation instructing signals, which means that the release signals are applied as inputs, the program proceeds to #207, thereby stopping the drive of vertical drive motor M4. Photographing operation is performed in #208 by following the release routine shown in FIG. 13 and then, the program returns to the main routine.

Operations in #211-#218 shown in FIG. 16B are those performed in a vertical direction of the operations in #201-#208 in FIG. 16A. The contents of the operations are the same and therefore no description thereof will be made.

Figure 17A:
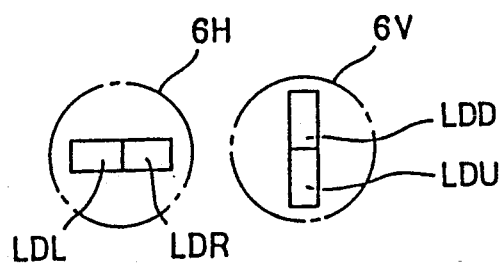
FIG. 17 is a diagram explaining the details of a light receiving window for remote control.

FIG. 17 is the diagram explaining the details of light receiving windows for remote control 6H and 6V. With reference to FIG. 17(a), remote control light receiving windows 6H and 6V include two light receiving elements LDL and LDR, and LDD and LDU, respectively.

Figure 17B:
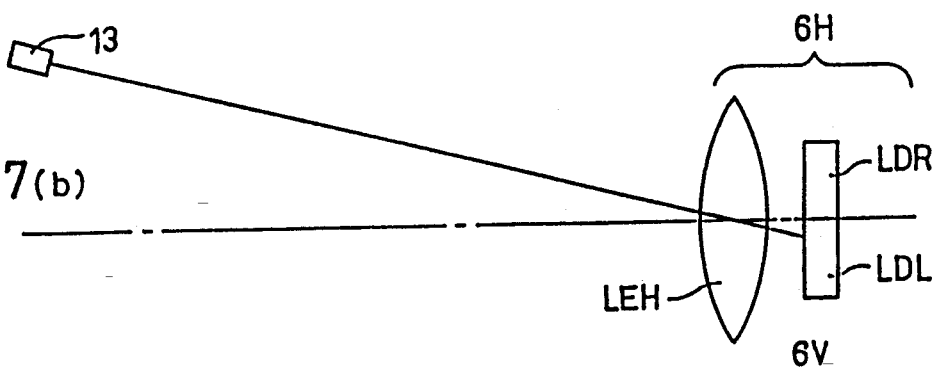

FIG. 17(b) is the diagram explaining a locational relation between the details of remote control light receiving widow 6H in a horizontal direction and remote control device 13. When a signal is applied to light receiving element LDL of horizontal remote control light receiving window 6H through a lens LEH, it is determined that remote control device 13 is positioned leftward with respect to the optical axis of the taking lens 7 as shown in the drawing.

Figure 17C:
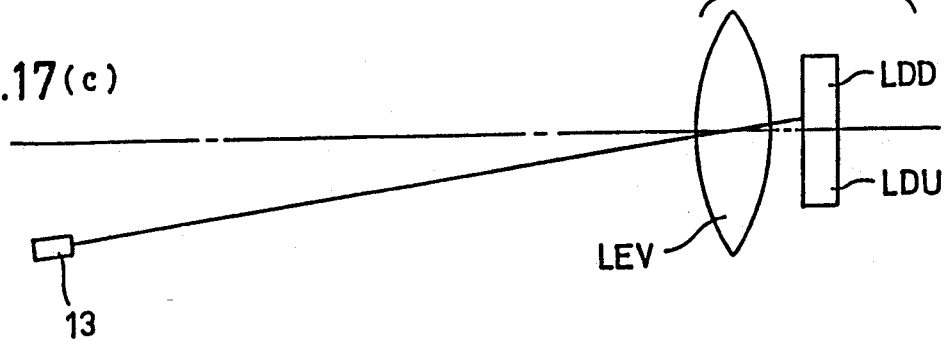

FIG. 17(c) shows a locational relation between the details of the remote control light receiving window 6V in the vertical direction and remote control device 13. As shown in the drawing, when a signal from remote control device 13 is applied to light receiving element LDD positioned above vertical remote control light receiving window 6V, the determination is made that remote control device 13 is positioned below the optical axis of taking lens 7.

Figure 13:
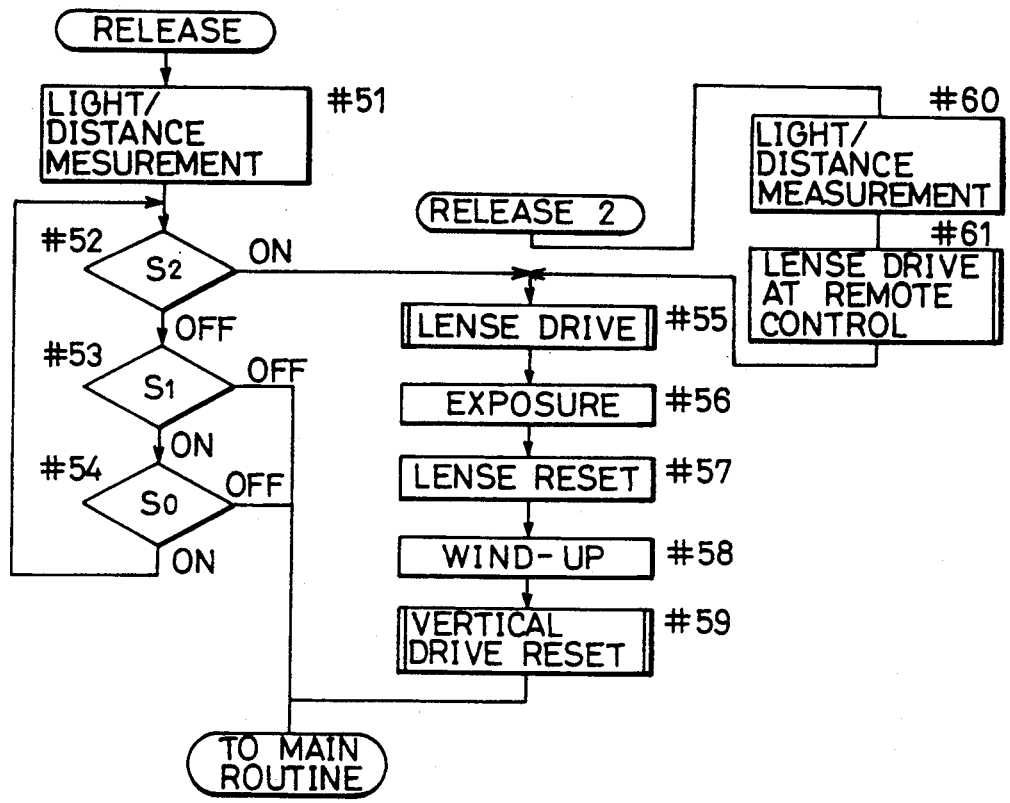
Figure 18:
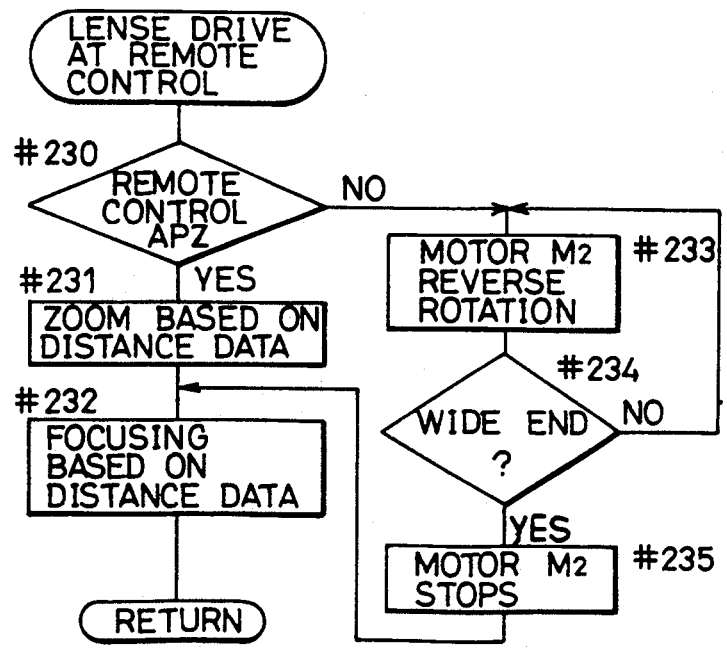
FIGS. 15A, 15B, 16A, 16B and 18 are flow charts explaining the operation of the remote control device.

FIG. 18 is the subroutine showing a lens driving operation by remote control shown in #61 of FIG. 13. With reference to FIG. 18, a lens driving operation in remote control will be described. If the determination is made in #230 that a remote control APZ mode (portrait mode) is set, a zooming operation based on distance measurement data is performed in #231. Thereafter, a focusing operation based on the distance measurement data is performed in #232, to return the program to the main routine. When the determination is made in #230 that the remote control APZ mode (portrait mode) is not set, which means that the remote control wide end mode (landscape mode) is set, the program proceeds to #233 to reversely rotate zoom motor Ml, thereby driving taking lens 7 to a wide end. When it is made sure in #234 that taking lens 7 reaches the wide end, zoom motor M1 is stopped in #235. After the focusing operation in #232, the program returns to the original routine.

While in the above-described embodiment, switching between a portrait mode and a landscape mode is made at the camera body, the remote control device can make this mode switching.

Furthermore, while in the above-described embodiment, the camera body is rotated until its optical axis faces in front of the remote control device, the camera body may be rotated until its optical axis has a positional relationship with the remote control device (for example, at an angle of 30 degrees with the remote control device).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote controlled camera system including a camera body and a remote control device emitting to said camera body a signal for rotating an optical axis of a taking lens provided at the camera body upward and downward or rightward and leftward, said camera body comprising:
   rotation driving means responsive to the signal from said remote control device for rotating the optical axis of said taking lens, and
   indicating means for indicating the optical axis of said taking lens reaching its rotational limit.

2. The remote controlled camera system according to claim 1, wherein said indicating means is a LED provided on the front surface of said camera body.

3. The remote controlled camera system according to claim 1, wherein said rotation driving means rotates the optical axis of said taking lens until the optical axis has a positional relationship with said remote control device.

4. The remote controlled camera system according to claim 1, wherein said rotation driving means is detachable to the camera body.

5. A remote controlled camera system including a camera body and a remote control device emitting to said camera body a signal for rotating an optical axis of a taking lens provided at said camera body upward and downward or rightward and leftward, said camera body comprising:

rotation driving means responsive to the signal from said remote control device for rotating the optical axis of said taking lens, and stopping means for stopping the rotation of the optical axis of said taking lens by said rotation driving means when receiving no signal from said remote control device for a predetermined time period.

6. The remote controlled camera system according to claim 5, wherein said rotation driving means rotates the optical axis of said taking lens until the optical axis has a positional relationship with said remote control device.

7. The remote controlled camera system according to claim 5, wherein said rotation driving means is detachable to the camera body.

8. A remote controlled camera system including a camera body and a remote control device emitting to said camera body a signal for rotating an optical axis of a taking lens provided at said camera body upward and downward or rightward and leftward, said camera body comprising:

rotation driving means responsive to the signal from said remote control device for rotating the optical axis of said taking lens, stopping means for stopping the rotation of the optical axis of said taking lens by said rotation driving means when receiving no signal from said remote control device, and inhibiting means for inhibiting the operation of said stopping means for a predetermined time period after receiving the signal from said remote control device.

9. The remote controlled camera system according to claim 8, wherein said rotation driving means rotates the optical axis of said taking lens until the optical axis has a positional relationship with said remote control device.

10. The remote controlled camera system according to claim 8, wherein said rotation driving means is detachable to the camera body.

* * * * *